(12) United States Patent
Niemelä

(10) Patent No.: US 8,341,746 B2
(45) Date of Patent: Dec. 25, 2012

(54) IDENTIFYING MALWARE

(75) Inventor: Jarno Niemelä, Espoo (FI)

(73) Assignee: F-Secure Corporation (Equivalently, F-Secure Oyj), Helsinki (FI)

(*) Notice: Subject to any disclaimer, the term of this patent is extended or adjusted under 35 U.S.C. 154(b) by 275 days.

(21) Appl. No.: 12/798,277

(22) Filed: Apr. 1, 2010

(65) Prior Publication Data
US 2010/0257609 A1    Oct. 7, 2010

(30) Foreign Application Priority Data
Apr. 3, 2009  (GB) ................................ 0905794.4

(51) Int. Cl.
*G06F 21/00*    (2006.01)

(52) U.S. Cl. ........................................ 726/24; 713/188

(58) Field of Classification Search ................ 726/22, 726/24
See application file for complete search history.

(56) References Cited

U.S. PATENT DOCUMENTS
7,152,164 B1    12/2006 Loukas
2004/0073810 A1*    4/2004 Dettinger et al. ............. 713/201
* cited by examiner

*Primary Examiner* — Gilberto Barron, Jr.
*Assistant Examiner* — Devin Almeida
(74) *Attorney, Agent, or Firm* — Harrington & Smith

(57) ABSTRACT

A method and apparatus for determining the identity of suspected malware on a client device. Information pertaining to the malware is sent from the client device to a server. The server determines a first required information set, and sends a request to the client device for the required information set. The client device compares the required information set with information stored at the client device, and returns the results of the comparison to the server. The server uses the results of the comparison to attempt to determine an identity of the malware. If the results of the comparison indicate that the suspected malware is one of a plurality of types of malware, a new required information set is determined, which is sent back to the client device, and the process repeated. Otherwise the identity of the suspected malware is determined, or it is determined that the suspected malware is unknown to the server.

18 Claims, 2 Drawing Sheets

IDENTIFYING MALWARE

FIELD OF THE INVENTION

The present invention relates to identifying malware on a computer system.

BACKGROUND TO THE INVENTION

Malware infection of computers and computer systems is a growing problem. Recently there have been many high profile examples where computer malware has spread rapidly around the world causing many millions of pounds worth of damage in terms of lost data and lost working time.

Malware is often spread using a computer virus. Early viruses were spread by the copying of infected electronic files onto floppy disks, and the transfer of the electronic file from the disk onto a previously uninfected computer. When the user tries to open the infected electronic file, the malware is triggered and the computer infected. More recently, viruses have been spread via the Internet, for example using e-mail. In the future it can be expected that viruses will be spread by the wireless transmission of data, for example by communications between mobile communication devices using a cellular telephone network.

Various anti-virus applications are available on the market today. These tend to work by maintaining a database of signatures or fingerprints for known viruses and malware. With a "real time" scanning application, when a user tries to perform an operation on a file, e.g. open, save, or copy, the request is redirected to the anti-virus application. If the application has no existing record of the electronic file, the electronic file is scanned for known virus or malware signatures. If a virus or malware is identified in a file, the anti-virus application reports this to the user, for example by displaying a message in a pop-up window. The anti-virus application may then add the identity of the infected file to a register of infected files.

As more viruses and malware are identified, anti-virus databases become larger. Furthermore, scanning and processing times become longer. In some computer system environments, file storage and processing are limited resources, and the anti-virus application and database should consume as few resources as possible. This is particularly important in devices such as mobile telephones which have limited memory and processing capabilities. Some mobile telephones use the Symbian™ operating system. The database for known Symbian viruses is currently around 500 kilobytes. A mobile telephone anti-virus database is typically updated wirelessly, and so transferring the database consumes a large amount of bandwidth and takes some time. This can be inconvenient and expensive for the mobile telephone user. Furthermore, the amount of memory available on mobile telephones is often limited, so storing the anti-virus database can have a detrimental impact on the user's experience, as they may prefer to use the storage for other types of file. A further problem is that the limited processing resources of a mobile telephone can be used by the anti-virus application to the detriment of other applications on the mobile telephone.

SUMMARY OF THE INVENTION

The inventor has realised that there is a problem with transferring and storing large anti-virus databases in computer systems, and also that there is a problem with processing resources being consumed by anti-virus applications. It is an object of the invention to mitigate this problem.

According to a first aspect of the invention, there is provided a method of determining the identity of suspected malware on a client device. Information pertaining to the malware and/or an electronic file is sent from the client device to a network server. The network server uses the information to determine a first required information set, and sends a request to the client device for the required information set. The client device compares the required information set with information stored at the client device, and returns the results of the comparison to the network server. The network server uses the results of the comparison to attempt to determine an identity of the malware. In the event that the results of the comparison indicate that the suspected malware is one of a plurality of types of malware, the results of the comparison are used to determine a new required information set which is sent back to the client device, and the process repeated. Otherwise the results of the comparison are used to determine either the identity of the suspected malware or that the suspected malware is unknown to the network server.

Any suitable information pertaining to the malware may be sent, including any of an electronic file name, a hash value associated with the electronic file, a location of the electronic file, date and time stamps associated with the electronic file, and registry settings associated with the electronic file.

The comparison at the client device of the required information set with information stored at the client device optionally includes a comparison of electronic file name, electronic file location and electronic file hash value. Furthermore, the results of the comparison may include an indication of whether an electronic file stored at the client device is at a location given in the required information set, but has a hash value different to the electronic file referred to in the required information set.

According to a second aspect of the invention, there is provided a Server for use in a communication network. The Server is provided with a first receiving function for receiving, from a client device, information pertaining to suspected malware stored at the client device. A processor is provided for determining a first required information set on the basis of the information pertaining to the suspected malware. A transmitting function is provided for sending to the client device a request for the required information set. A second receiving function is provided for receiving from the client device a result of a comparison of the required information set with information stored at the client device. The processor is arranged to use the results of the comparison and information retrieved from a database to attempt to determine an identity of the malware. If the results of the comparison indicate that the suspected malware is one of a plurality of types of malware, then a new required information set is determined and sent to the client device.

As an option, the first receiving function is arranged to receive information pertaining to said malware selected from any of an electronic file name, a hash value associated with the electronic file, a location of the electronic file, date and time stamps associated with the electronic file, and registry settings associated with the electronic file.

According to a third aspect of the invention, there is provided a client device for use in a communication network. A memory is provided for storing a plurality of types of electronic files. A processor is also provided for determining whether an electronic file stored in the memory is infected with malware. A first transmitting function is provided for sending information pertaining to the malware to a network server. A receiving function is provided for receiving from the network server a request for a required information set. The processor is further arranged to compare the required information set with information stored at the client device, and a second transmitting function is provided for sending the results of the comparison to the network server.

As an option, the first transmitting function is arranged to send information pertaining to the malware selected from any of an electronic file name, a hash value associated with the electronic file, a location of the electronic file, date and time stamps associated with the electronic file, and registry settings associated with the electronic file.

The processor is optionally arranged to perform the comparison of the required information set with information stored at the client device by comparing electronic file name, electronic file location and electronic file hash value. Furthermore, the second transmitting function may optionally be arranged to send results of the comparison including an indication of whether an electronic file stored at the client device is at a location given in the required information set, but has a hash value different to the electronic file referred to in the required information set.

The receiving function is optionally arranged to receive from the Server information identifying the malware.

As an option, the receiver is arranged to receive from the Server instructions for disinfecting the infected electronic file.

Examples of suitable client devices include any of a personal computer, a mobile telephone and a personal digital assistant.

According to a fourth aspect of the invention, there is provided a method of operating a client device in a communication network. The client device stores a plurality of types of electronic files, and a determination is made that a stored electronic is malware. Information pertaining to the malware is sent to a network server, and a request for a required information set is subsequently received from the network server. A comparison is made of the required information set with information stored at the client device, and the results of the comparison are then sent to the network server. This allows the network server to attempt to identify the malware. The information pertaining to the malware is optionally selected from any of an electronic file name, a hash value associated with the electronic file, a location of the electronic file, date and time stamps associated with the electronic file, and registry settings associated with the electronic file.

According to a fifth aspect of the invention, there is provided a computer program, comprising computer readable code which, when run on a Server, causes the Server to behave as a Server as described above in the second aspect of the invention.

According to a sixth aspect of the invention, there is provided a computer program product comprising a computer readable medium and a computer program as described above in the fifth aspect of the invention, wherein the computer program is stored on the computer readable medium.

According to a seventh aspect of the invention, there is provided a computer program, comprising computer readable code which, when run on a client device, causes the client device to behave as a client device as described above in the third aspect of the invention.

According to an eighth aspect of the invention, there is provided a computer program product comprising a computer readable medium and a computer program as described above in the seventh aspect of the invention, wherein the computer program is stored on the computer readable medium.

DETAILED DESCRIPTION OF CERTAIN EMBODIMENTS

The following invention is described in relation to a mobile telephone, although it will be appreciated by the person skilled in the art that the invention can also apply to other types of client devices such as Personal Digital Assistants (PDAs), laptops, desktop personal computers and so on.

Figure 1:
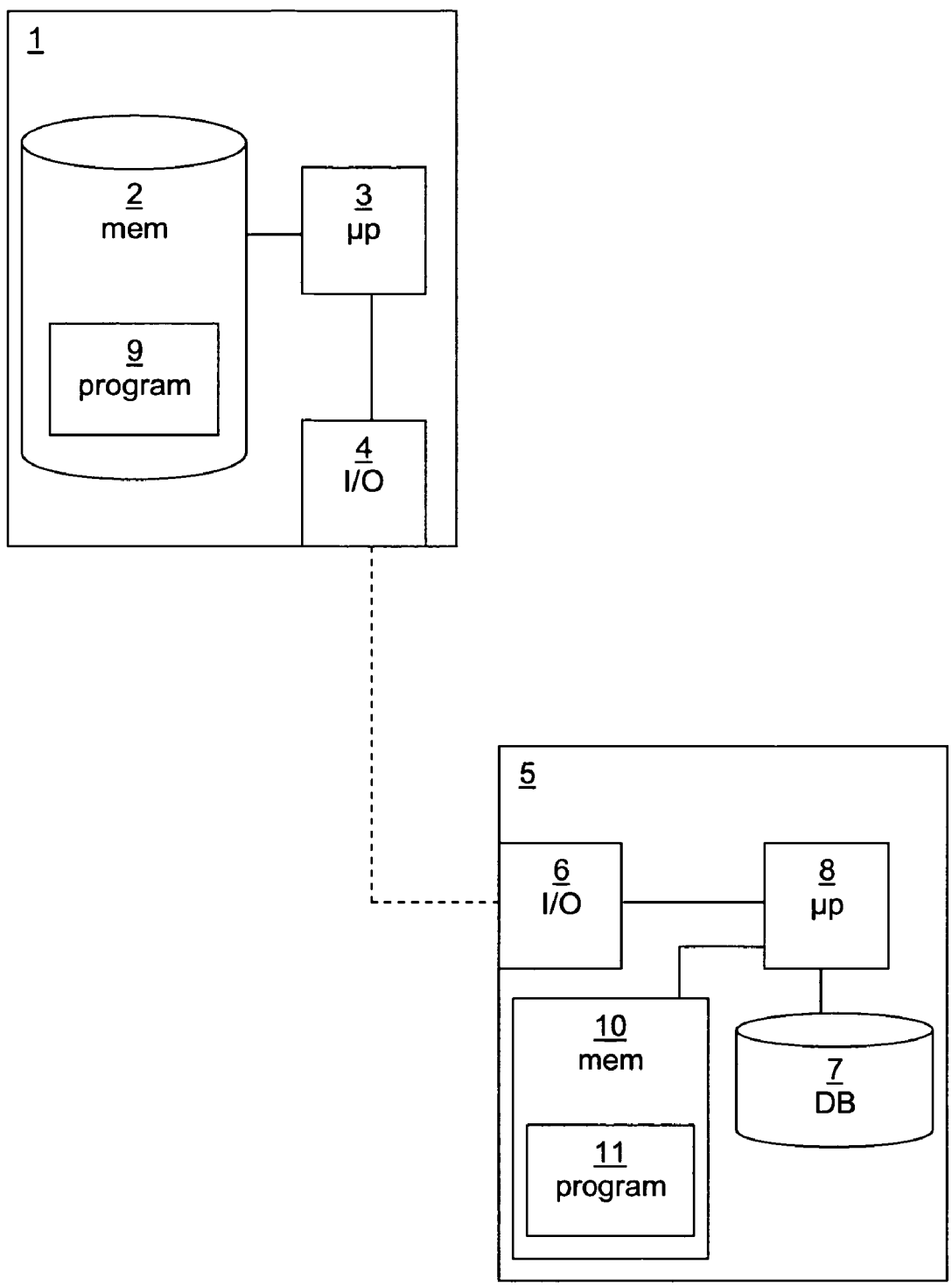
FIG. 1 illustrates schematically in a block diagram a computer system according to an embodiment of the invention.

Referring to FIG. 1, a client device such as a mobile telephone 1 has a memory 2 at which a plurality of electronic files are stored. A processor 3 is also provided. The processor executes an anti-virus application to scan the memory 2 for any infected files. In the event that an infected file is identified, the mobile telephone 1 sends a request message via an In/Out device 4 to a remote server 5 operated by a provider of anti-virus software. The memory 2 (or alternatively, a separate physical memory) is in the form of a computer readable medium, and is used to store a program 9 which, when executed by the processor 3, causes the client device to behave as described herein.

The request message requests assistance with identifying the malware with which the file is infected. This operation is normally carried out by the mobile telephone 1 and is a processor intensive operation. The request message includes the identity of the infected file and a hash value associated with the infected file. The hash value is used to validate the signature of the infected file. Hash values may typically be MD5, SHA-1 etc.

The remote server 5 is provided with a communications device 6 with which to communicate with the mobile telephone 1, and a database 7 of all known malware. The database 7 is periodically updated by the server administrators as new malware is identified. A processor 8 queries the database 7 to match the file identity and hash values with file identities of hash values stored in the database 7. This results in a server list of possible candidates for the malware with which the file at the mobile telephone 1 is infected.

The server 5 responds to the mobile telephone 1 with a response message containing the list of possible malware. The list also contains, for each possible malware, an expected location of the file and its hash value. The mobile telephone then attempts to locate each file in the received list.

The mobile telephone 1 responds to the server with a mobile telephone list identifying which files were found in the expected location and which files were not. The response to the server also includes information identifying files found in the specified locations but having a hash value that did not match the expected hash value send in the server list.

The server 5 analyses the received mobile telephone list and prepares a new server list which is send to the mobile telephone. Again, the mobile telephone responds with a new mobile telephone list. This process is repeated until only one identified malware remains or the server has determined that the infected file does not have a known malware. This therefore either positively identifies the malware or determines that the file is infected with a previously unknown malware.

The server 5 may also be provided with a memory 10 in the form of a computer readable medium. A program 11 is stored in the memory 10. When the program 11 is executed by the processor, the server behaves as described herein.

Figure 2:
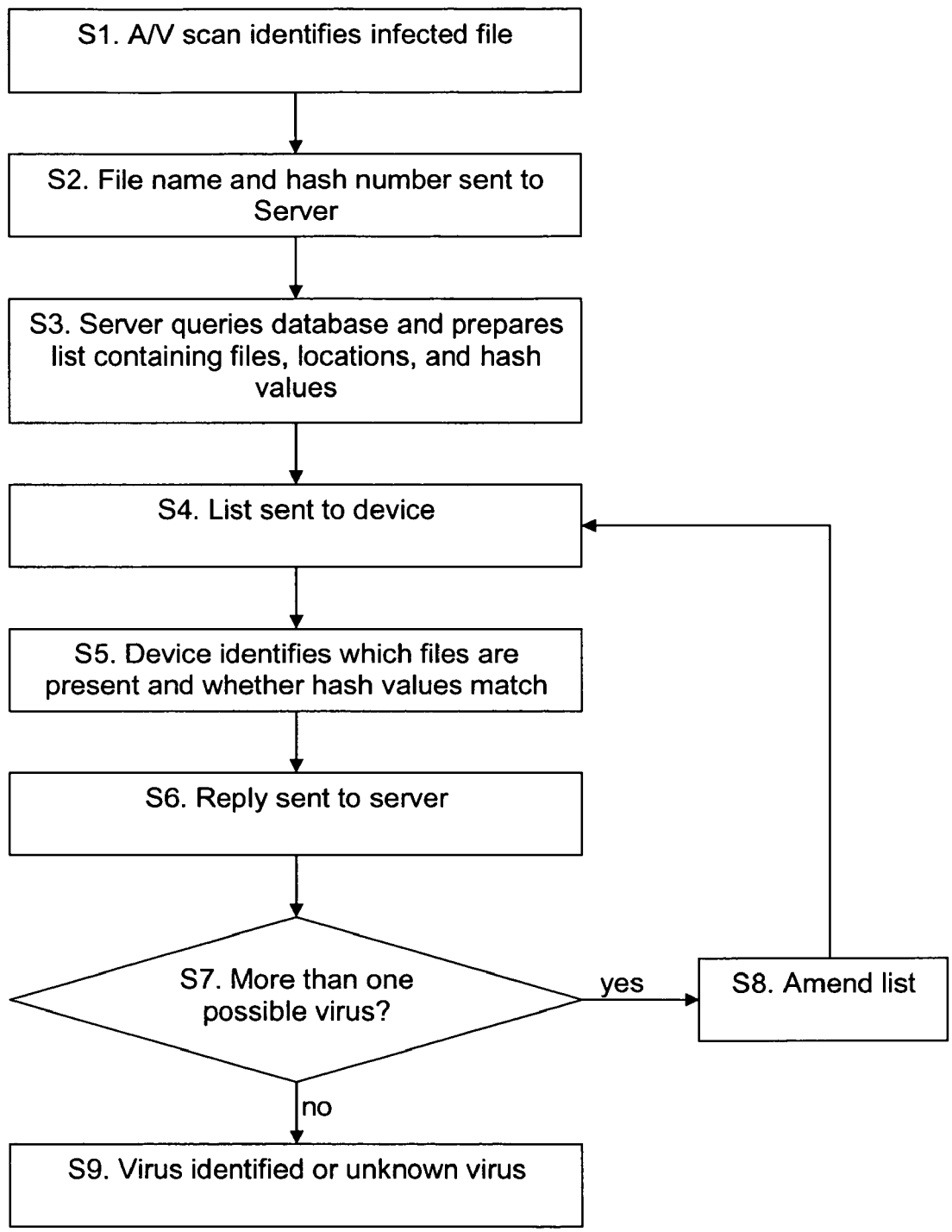
FIG. 2 is a flow diagram illustrating a method of populating an anti-virus database exclusion list.

The flow diagram of FIG. 2 summarizes the steps of the invention, with the following numbering corresponding to that of FIG. 2:

S1. An anti-virus application running on the mobile telephone 1 identifies that a file is infected, but does not know the identity of the infecting malware.

S2. The file name and hash number is sent to the server 5

S3. The server 5 queries the database 7 and prepared a list containing files, location and hash values that are typically found for candidate malware.

S4. The list is sent to the mobile telephone 1.

S5. The mobile telephone determines which files are present, whether they are in the expected location, and whether or not the hash values match.

S6. A reply is sent to the server 5 that includes the information determined in step S5.

S7. The server 5 uses the information in the reply and information obtained from the database to determine whether the file could be infected with one of a plurality of types of malware.

S8. If it is determined that the file could be infected with one of a plurality of types of malware, then the list is amended in the light of information obtained from the database and the information received in the reply, and the list is returned to the device. Steps S4 to S7 are repeated.

S9. If it is determined that the file could be infected with only one type of malware, then a positive identification of the virus has been made. Alternatively, it may be determined that the file is infected with malware that is unknown to the database.

Of course, once the malware has been identified then the server may provide the mobile telephone with instructions or a script to disinfect the infected file and remove the malware. If it is determined that the malware is unknown to the database, then information may be passed to a research team to investigate the malware further, identify signatures specific to the malware and develop methods for disinfecting files infected with the malware.

It will be appreciated by the person of skill in the art that various modifications may be made to the above described embodiment without departing from the scope of the present invention. For example, the examples given above show the client device having only one memory. It will be appreciated that the memory may be a hard drive, an optical drive, a Random Access Memory, or any other type of memory, and that more than one memory may be provided. Furthermore, the memory may be remotely connected to the client device.

The invention claimed is:

1. A method of determining the identity of suspected malware on a client device, the method comprising:
   1) sending information pertaining to said malware and/or an electronic file from the client device to a network server;
   2) at the network server, using said information to determine a first required information set;
   3) sending to the client device a request for the required information set;
   4) at the client device, comparing the required information set with information stored at the client device, and returning the results of the comparison to the network server;
   5) at the network server, using the results of the comparison to attempt to determine an identity of the malware;
   6) in the event that the results of the comparison indicate that the suspected malware is one of a plurality of types of malware, using the results of the comparison to determine a new required information set and repeating steps 2 to 6; and
   7) determining the identity of the suspected malware from the results of the comparison or determining that the suspected malware is unknown to the network server.

2. The method according to claim 1, wherein the information pertaining to said malware includes any of an electronic file name, a hash value associated with the electronic file, a location of the electronic file, date and time stamps associated with the electronic file, and registry settings associated with the electronic file.

3. The method according to claim 1, wherein the comparison at the client device of the required information set with information stored at the client device includes a comparison of electronic file name, electronic file location and electronic file hash value.

4. The method according to claim 1, wherein the comparison at the client device of the required information set with information stored at the client device includes a comparison of electronic file name, electronic file location and electronic file hash value, and wherein the results of the comparison include an indication of whether an electronic file stored at the client device is at a location given in the required information set, but has a hash value different to the electronic file referred to in the required information set.

5. A Server for use in a communication network, the Server comprising:
   a first receiving function for receiving from a client device information pertaining to suspected malware stored at the client device;
   a processor for determining a first required information set on the basis of said information pertaining to the suspected malware;
   a transmitting function for sending to the client device a request for the required information set;
   a second receiving function for receiving from the client device a result of a comparison of the required information set with information stored at the client device,
   wherein the processor is arranged to use the results of the comparison and information retrieved from a database to attempt to determine an identity of the malware; and, in the event that the results of the comparison indicate that the suspected malware is one of a plurality of types of malware, using the results of the comparison to determine a new required information set and sending the, new required information set to the client device.

6. The Server according to claim 5, wherein the first receiving function is arranged to receive information pertaining to said malware selected from any of an electronic file name, a hash value associated with the electronic file, a location of the electronic file, date and time stamps associated with the electronic file, and registry settings associated with the electronic file.

7. A client device for use in a communication network, the client device comprising:
   a memory arranged to store a plurality of types of electronic files;
   a processor for determining whether an electronic file stored in the memory is infected with malware;
   a first transmitting function for sending information pertaining to said malware to a network server;
   a receiving function for receiving from the network server a request for a required information set;
   wherein the processor is further arranged to compare the required information set with information stored at the client device; and
   a second transmitting function for sending the results of the comparison to the network server.

8. The client device according to claim 7, wherein the first transmitting function is arranged to send information pertaining to said malware selected from any of an electronic file name, a hash value associated with the electronic file, a location of the electronic file, date and time stamps associated with the electronic file, and registry settings associated with the electronic file.

9. The client device according to claim 7, wherein the processor is arranged to perform the comparison of the required information set with information stored at the client device by comparing electronic file name, electronic file location and electronic file hash value.

10. The client device according to claim 7, wherein the processor is arranged to perform the comparison of the required information set with information stored at the client device by comparing electronic file name, electronic file location and electronic file hash value, and the second transmitting function is arranged to send results of the comparison including an indication of whether an electronic file stored at the client device is at a location given in the required information set, but has a hash value different to the electronic file referred to in the required information set.

11. The client device according to claim 7, wherein the receiving function is arranged to receive from the Server information identifying the malware.

12. The client device according to claim 7, wherein the receiver is arranged to receive from the Server instructions for disinfecting the infected electronic file.

13. The client device according to claim 7, wherein the computer system is selected from any of a personal computer, a mobile telephone and a personal digital assistant.

14. A method of operating a client device in a communication network, the method comprising:
storing a plurality of types of electronic files;
determining whether a stored electronic is malware;
sending information pertaining to said malware to a network server;
receiving from the network server a request for a required information set;
comparing the required information set with information stored at the client device; and
sending the results of the comparison to the network server.

15. A computer program, comprising computer readable code which, when run on a Server, causes the Server to behave as a Server as claimed in claim 5.

16. A computer program product comprising a non-transitory computer readable medium and a computer program according to claim 15, wherein the computer program is stored on the non-transitory computer readable medium.

17. A computer program, comprising computer readable code which, when run on a client device, causes the client device to behave as a client device as claimed in claim 7.

18. A computer program product comprising a non-transitory computer readable medium and a computer program according to claim 17, wherein the computer program is stored on the non-transitory computer readable medium.

* * * * *